United States Patent [19]
Kittstein

[11] 3,985,326
[45] Oct. 12, 1976

[54] BRACKET DEVICE

[76] Inventor: Nicholas Kittstein, Hoffman Station Road, Jamesburg, N.J. 08831

[22] Filed: Aug. 27, 1975

[21] Appl. No.: 608,026

[52] U.S. Cl. ............ 248/226 A; 248/309 A
[51] Int. Cl.² .............. A47F 5/00; F16M 11/12
[58] Field of Search ........... 248/14, 226 R, 226 A, 248/226 D, 228, 309

[56] References Cited
UNITED STATES PATENTS

| | | | |
|---|---|---|---|
| 199,167 | 1/1878 | Robinson | 248/226 C |
| 680,680 | 8/1901 | Armstrong et al. | 248/226 A |
| 1,708,497 | 4/1929 | Clithero | 248/226 A |
| 3,469,810 | 9/1969 | Dorris | 248/228 |

FOREIGN PATENTS OR APPLICATIONS

| | | | |
|---|---|---|---|
| 343,938 | 10/1904 | France | 248/178 |
| 339,368 | 12/1930 | United Kingdom | 248/178 |

*Primary Examiner*—J. Franklin Foss
*Attorney, Agent, or Firm*—Leonard R. Fellen

[57] ABSTRACT

A bracket device has an extended plate-like body member with an upstanding cylindrical extension formed at one end and externally threaded for coupling to an engineers instrument, and a clamp means formed at the other end to mount the device to a column.

8 Claims, 6 Drawing Figures

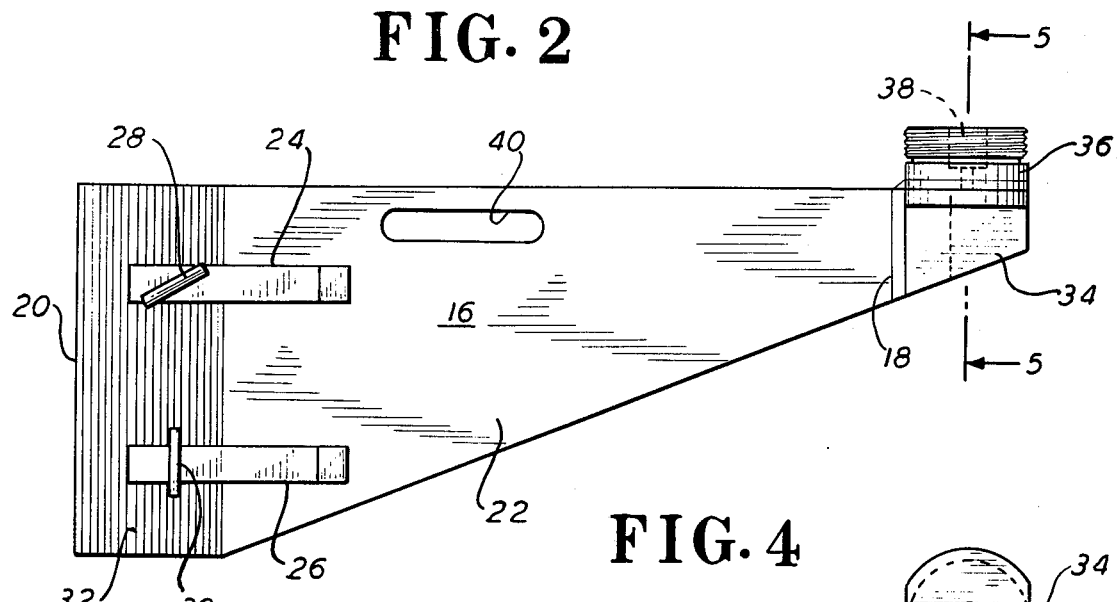
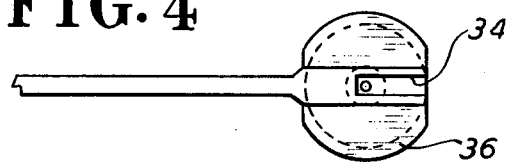
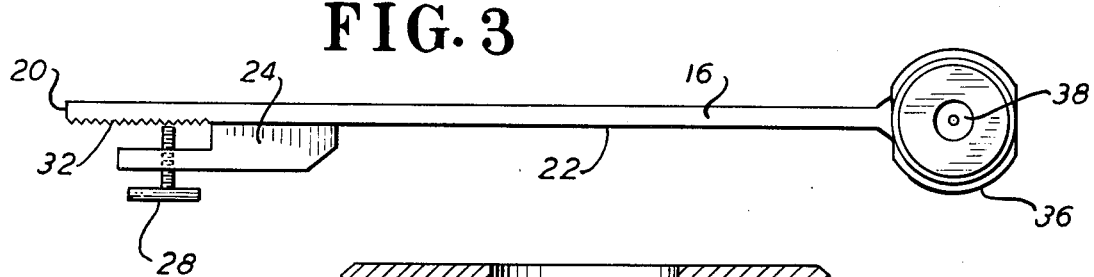
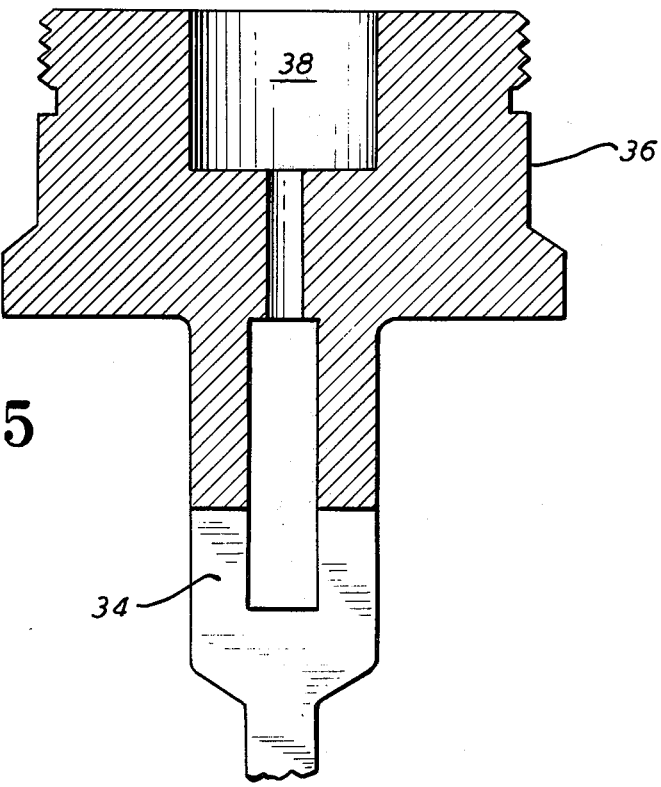

BRACKET DEVICE

This invention relates to standards or brackets and more particularly to a bracket device adapted for mounting on a building column or the like, for supporting surveying instruments, as for example, a transit.

In the construction and building industry, surveyors and engineers in the performance of their work generally make use of a transit device for measuring horizontal angles. In use, the transit is generally mounted or supported on a three legged tripod. However, problems encountered in the use of such a tripod support is that when used on the ground, i.e. on the earth, the tripod legs have to be dug into the ground beneath the surface thereof to insure that the tripod support for the transit will be ridged. If the ground were frozen, then upon thawing of same, the tripod may shift and the transit mounted thereon would have to be releveled before use. The same would be true if the ground were muddy or relatively soft such that the tripod legs were prone to shift. In the case of construction work on the upper floors of a multi-story building, a temporary platform or floor deck is generally built to support the surveyor's tripod and transit. However, in this type of use, and with no dirt for the tripod legs to dig into, the tripod is easily subject to movement, thereby requiring a constant checking and releveling of the transit device during use. Also in heavy wind, there is the strong possibility that the tripod, standing free on a platform, will be blown over, with a resulting possible damage to the instrument mounted thereon.

It is an object of the present invention to provide a standard or bracket device adapted for mounting on a building column or on an upstanding piece of angle iron, and which may be used for supporting an engineer's or surveyor's instrument, as for example, a transit.

Briefly described, the bracket device of the present invention includes an elongated plate-like body member having an upstanding cylindrical extension formed at one end and externally threaded for coupling to an engineers instrument, and a clamp means formed at the other end to mount the device to a column.

The novel features which are considered characteristic of the invention are set forth with particularity in the appended claims. The invention itself, however, both as to its organization and method of operation, as well as additional objects and advantages thereof, will best be understood from the following description, when read in connection with the accompanying drawing in which:

FIG. 2 is a side view of the bracket device of FIG. 1;

FIG. 3 is a top view of the bracket device of FIG. 1;

FIG. 4 is a partial bottom view of the bracket device of FIG. 1;

FIG. 5 is an enlarged sectional end view of the bracket device taken on line 5—5 of FIG. 2.

Figures 1, 6:
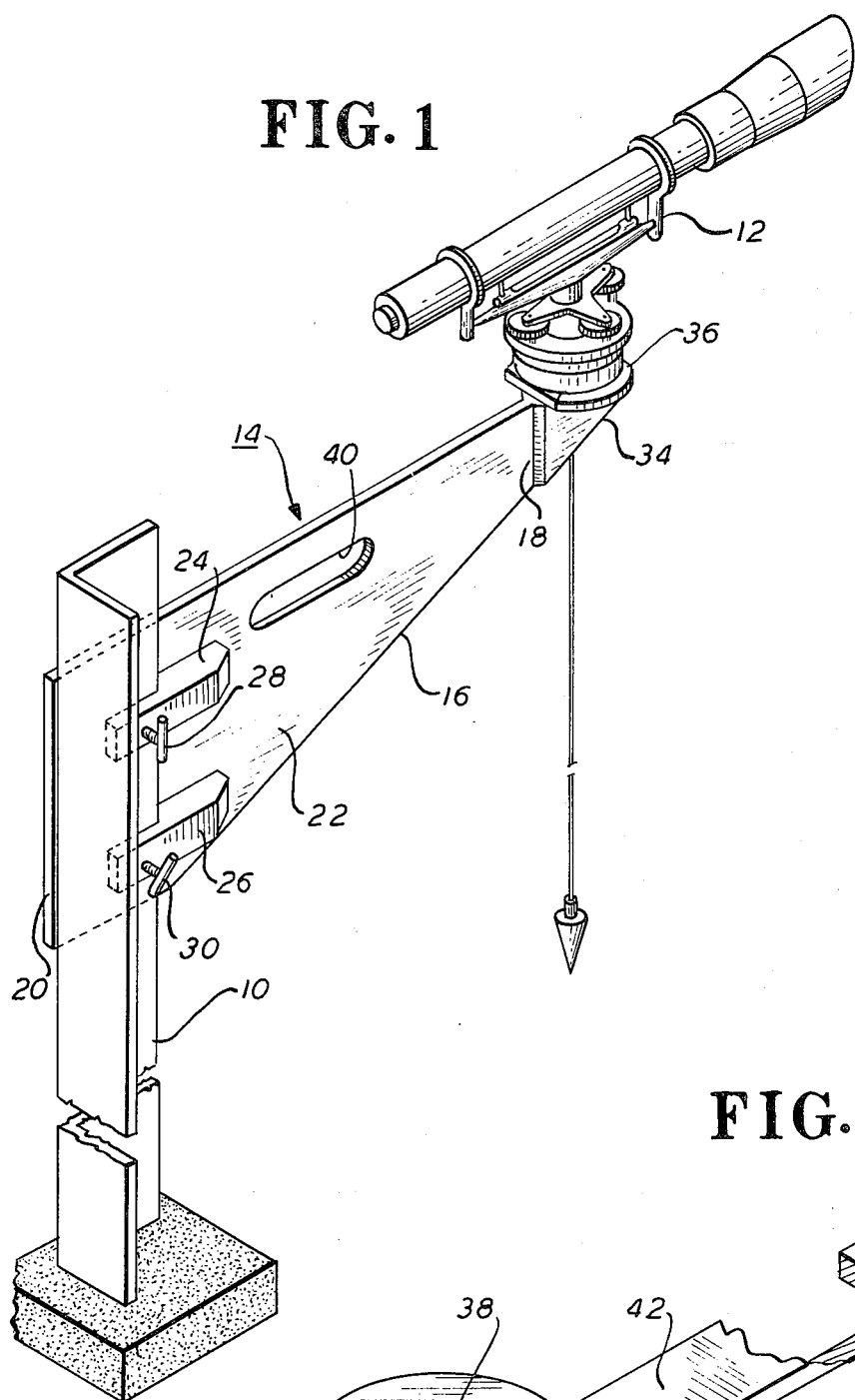
FIG. 1 is a perspective view of the bracket device of the present invention shown mounted on an upstanding angle iron.
FIG. 6 is a fragmentary perspective view of another embodiment of the invention showing a supporting flange to reinforce the plate portion.

Referring now to the drawing, wherein like reference numerals will be used to designate like parts in the various figures, and particularly to FIGS. 1 through 5, the bracket of the invention is shown as being mounted on a vertically oriented upstanding angle iron or building column 10 and supporting a transit or level 12, hereinafter collectively referred to as "engineering instrument". The bracket 14 includes a first plate like main body portion 16 of uniform thickness, generally rectangular in shape and preferably truncated or tapered inwardly along the underside toward one end 18 as shown particularly in FIG. 2, to reduce the mass and weight of the device.

Mounted near the other end 20 of the said first portion 16 on the one side 22 thereof, as by welding or being integrally formed therewith, are two spaced apart clamp members 24 and 26, each having a threaded opening receiving respective turn screws 28 and 30 for fastening the device to an angle iron or column support (hereinafter collectively referred to as "comumn"). The surface of the body portion side mounting the clamps 24 and 26, and extending from the clamps toward the end 20 is preferably ridged as shown as 32 to provide a slip-free friction contact with the column on which the device of the invention is mounted in use.

Extended from and integrally formed along opposite sides of the tapered end of the main body portion 16 is a second body portion formed by thickened end members defining a bifurcated end 34 and supporting a cylindrical portion 36 externally screw threaded and having an aperture 38 extending therethrough and merging with the bifurcated opening in the end 34.

Substantially central to the body portion 16 is an elongated aperture 40 formed therein to provide a convenient means for gripping the divice for carrying same when not in use.

The device of the invention as illustrated in preferred embodiments in the Figures is preferably made of a non-ferrous material, such as aluminum, with the main body portion being approximately ½ inch thick and having a length of approximately 24 inches, the one side thereof being approximately 10 inches high and the other side which supports the cylindrical mounting portion being approximately 3 inches high. The cylindrical mounting portion, also is preferably constructed of aluminum and in the preferred embodiment is 3½ inches in outside diameter, the inside diameter of the aperture being approximately 1¼ inches, and the screw threads having a pitch of 8 threads to the inch. It will be noted that the 3 inch diameter of the cylindrical mounting portion and particular thread pitch are complimentary to the mounting flange generally found on the base of an engineer's level and surveyor's transit.

It will be appreciated that by means of the two clamp members 24 and 26, the bracket device of the invention can be easily and conveniently clamped or fixed to a vertically oriented angle iron or a column which may form part of a structure being constructed. Thereafter, and as was heretofore noted, an engineer's instrument, as for example, a level, can be conveniently mounted on the cylindrical support end of the bracket. In general, the base portion of the transit which is generally also threaded at 8 threads to the inch, is received over the cylindrical member of the bracket with a ball coupling usually seated on the bottom of the instrument flange received within the aperture in the cylindrical portion of the bracket. Since the bracket is constructed of a non-ferrous material, it can be used regardless of the weather, without deleteriously being affected by the elements, and can be left in place when not in use.

As a feature of the present invention, a chain or string can be dropped from the bottom of the instrument ball coupling so as to extend through the aperture in the bracket end and a plumb bob can be connected to the other end of the string so as to allow an engineer when using the bracket device to mount and align an instrument for a true vertical. The use of the chain or string extending through the hole in the cylindrical portion of the bracket can also serve for the plumbing of building columns.

In FIG. 6 there is illustrated a partial perspective view of a portion of the bracket device in an alternate embodiment wherein the main body portion 16 is shown as being reinforced with a top flange member 42 and which extends substantially along the length of the said body portion 16. It has been found that this reinforced construction of the bracket device will improve its stability when mounted on the upper floor columns of tall buildings, and where high velocity winds are likely to be encountered.

It will be seen from the foregoing that there has been provided a bracket device for rigidly mounting an engineering instrument to a vertical angle or column and as such providing a solid immovable support for said instrument. Since the bracket is rigidly mounted on the column, upon the remounting of an instrument on the bracket, the height of the bracket mounting will not have changed, thereby eliminating the need to re-calculate the elevation of the bracket prior to use of the instrument, as is normally the case when a tripod, which is subject to movement, is used.

What is claimed is:

1. A bracket device for supporting an engineering instrument and for mounting on a column, comprising:
   a first plate-like elongated body portion having substantially parallel planar side surfaces;
   a second body portion integral with said first body portion and forming an extension of one end thereof;
   first means integral with said second body portion and providing a coupling for supportingly mounting an engineering instrument on said extended one end of said first body portion;
   second means formed on one of said side surfaces of said first body portion near the other end thereof for mounting said bracket device on a column; and
   said first means including a cylindrical member having an aperture extending therethrough, said cylindrical member projecting from said second body portion and being externally screw threaded for receiving thereon a mating base flange of an engineering instrument.

2. A bracket device as set forth in claim 1 wherein said second body portion is bifurcated to provide an opening which merges with the aperture in said cylindrical member.

3. A bracket device as set forth in claim 2 wherein said first body portion included an elongated aperture centrally positioned along the length thereof for providing a means for carrying said bracket device.

4. A bracket device as set forth in claim 2 and further including means formed on said first body member one side surface adjacent said second means for providing a frictonal coupling of said bracket device to a column in mounting thereon.

5. A bracket device as set forth in claim 4 and further including a bar-like member extending along the length of said first and second body portions between said projecting cylindrical member and the other end of said first body portion and providing a flattened surface substantially perpendicular to the parallel side surfaces of said first body portion.

6. A bracket device as set forth in claim 1 wherein said second means includes:
   at least one finger-like member parallel to said one side surface and projecting toward said first body portion other end and defining an opening between said finger-like member and said body portion side surface, said finger-like member having a threaded aperture extending therethrough; and
   screw means received within the threaded aperture of said finger-like member to form a clamp for tightening said bracket device against a column received within said opening.

7. A bracket device as set forth in claim 6 wherein said one side surface of said first body portion defining said opening with said finger-like member is ridged to provide a friction grip against a column received within said opening and when said screw means is tightened against said received column.

8. A bracket device for supporting an engineering instrument and for mounting on a column, comprising:
   an elongated plate member of substantially uniform thickness in a lengthwise direction between first and second opposite ends thereof;
   a cylindrical member formed at said first end of said plate member and projecting perpendicular to said length direction, said cylindrical member having an aperture extending centrally therethrough and being externally threaded for receiving thereon a mating base flange of an engineering instrument;
   clamping means coupled to said plate member near the second end thereof and including two spaced apart finger-like members one above the other and parallel to one side of said plate member and extending toward said second end, said finger-like members each having a threaded bore and each finger-like member defining an opening between the surface of said plate member and said finger-like members for receiving within said opening a column on which said bracket is to be mounted;
   first and second screw members each being received through a respective bore in said two finger members for providing a clamp to retain said received column with said finger member openings; and
   means formed on said plate member on the side adjacent said finger-like members and within the openings defined thereby for providing a frictional coupling of said bracket device to a column member when mounted thereto.

* * * * *